US008827287B2

United States Patent
Michel

(10) Patent No.: US 8,827,287 B2
(45) Date of Patent: Sep. 9, 2014

(54) AXLE CONTROL ELEMENT OF A MOTOR VEHICLE

(75) Inventor: Wilfried Michel, Riedenburg (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/813,385

(22) PCT Filed: Jun. 17, 2011

(86) PCT No.: PCT/EP2011/002991
§ 371 (c)(1),
(2), (4) Date: Jan. 30, 2013

(87) PCT Pub. No.: WO2012/016610
PCT Pub. Date: Feb. 9, 2012

(65) Prior Publication Data
US 2013/0127131 A1 May 23, 2013

(30) Foreign Application Priority Data
Jul. 31, 2010 (DE) .......................... 10 2010 033 002

(51) Int. Cl.
*B60G 21/055* (2006.01)
*B60G 11/20* (2006.01)
*B60G 11/18* (2006.01)
(52) U.S. Cl.
CPC .......... *B60G 21/055* (2013.01); *B60G 21/0551* (2013.01); *B60G 21/0555* (2013.01); *B60G 11/18* (2013.01); *B60G 11/20* (2013.01)
USPC ................................ 280/124.106; 280/5.507
(58) Field of Classification Search
CPC ...... B60G 21/055; B60G 11/18; B60G 11/20; B60G 21/0551

USPC ......... 280/124.106, 124.137, 124.149, 5.506, 280/5.507
See application file for complete search history.

(56) References Cited

U.S. PATENT DOCUMENTS 2,175,562 A * 10/1939 Frohlich ...................... 267/278
2,607,610 A   8/1952 Allison
(Continued)

FOREIGN PATENT DOCUMENTS

| DE | 916 260 | 12/1953 |
| DE | 1 290 827 | 3/1969 |

(Continued)

OTHER PUBLICATIONS

International Search Report issued by the European Patent Office in International Application PCT/EP2011/002991.

*Primary Examiner* — Nicole Verley
(74) *Attorney, Agent, or Firm* — Henry M Feiereisen LLC

(57) ABSTRACT

An axle control element of a motor vehicle has a torsion spring system connected to a wheel control element via a rotary spring arm and fixedly supported on the vehicle body via a controllable actuator. The torsion spring system has a torsion spring rod nested inside a torsion spring tube. An actuator unit is spaced apart from the torsion spring system and is fixed on the vehicle body and a pivotally controllable drive lever is connected to the actuator unit. The drive lever is connected to a torsion spring tube, and an output lever is connected to a torsion spring rod and directly or indirectly via a coupling to the wheel control element. Alternatively, the drive lever is connected to a torsion spring rod, and the output lever is connected to a torsion spring tube and directly or indirectly via a coupling to the wheel control element.

9 Claims, 2 Drawing Sheets

(56) References Cited

U.S. PATENT DOCUMENTS

| | | | |
|---|---|---|---|
| 2,788,982 A * | 4/1957 | Allison | 280/124.101 |
| 2,792,235 A * | 5/1957 | Federspiel | 280/5.507 |
| 2,949,315 A * | 8/1960 | Taylor | 180/41 |
| 2,991,088 A * | 7/1961 | Kozicki | 280/6.159 |
| 8,195,361 B2 * | 6/2012 | Kajino et al. | 701/38 |
| 8,485,539 B2 * | 7/2013 | Bidlake et al. | 280/124.107 |
| 8,562,009 B2 * | 10/2013 | Michel | 280/124.137 |
| 2010/0072723 A1 * | 3/2010 | Ciasulli | 280/124.106 |
| 2011/0210525 A1 | 9/2011 | Michel | |
| 2011/0278812 A1 * | 11/2011 | Ohletz et al. | 280/124.106 |

FOREIGN PATENT DOCUMENTS

| | | |
|---|---|---|
| DE | G 87 03 322 | 6/1987 |
| DE | 100 01 087 | 7/2001 |
| DE | 102004042345 | 3/2005 |
| DE | 202007005569 | 9/2008 |
| DE | 102009005895 | 7/2010 |
| EP | 0 197 850 | 10/1986 |
| EP | 0 292 392 | 11/1988 |
| EP | 1 609 633 | 12/2005 |
| EP | 1 609 634 | 12/2005 |
| EP | 1 958 804 | 8/2008 |
| EP | 2 322 366 | 5/2011 |
| FR | 1 153 797 | 3/1958 |
| JP | 1190515 | 7/1989 |
| WO | WO 2010/083875 | 7/2010 |
| WO | WO 2010/083876 | 7/2010 |

* cited by examiner

AXLE CONTROL ELEMENT OF A MOTOR VEHICLE

CROSS-REFERENCES TO RELATED APPLICATIONS

This application is the U.S. National Stage of International Application No. PCT/EP2011/002991, filed Jun. 17, 2011, which designated the United States and has been published as International Publication No. WO 2012/016,610 and which claims the priority of German Patent Application, Serial No. 10 2010 033 002.7, filed Jul. 31, 2010, pursuant to 35 U.S.C. 119(a)-(d).

BACKGROUND OF THE INVENTION

The invention relates to an axle control element of a motor vehicle.

A conventional generic axle control element has a torsion spring system as an accumulator spring which is, on one hand, connected via a rotary arm to the wheel guide element and which is, on the other hand, supported on the vehicle body via a controllable actuator.

DE 100 01 087 A1 also discloses an electromechanical stabilizer for the chassis of a vehicle, which includes an actuator integrated between two stabilizer halves and capable of rotating these if necessary relative to one another by a rotation angle, with the actuator composed of an electric motor and a gear connected to the output of the motor. This represents a conventional U-shaped stabilizer which is divided in the middle and whose stabilizer halves can be controllably rotated relative to each other, in particular to improve the roll characteristics. The output shaft journal of the transmission is connected to a stabilizer half for co-rotation with the stabilizer half.

Furthermore, a similar arrangement is disclosed in EP 1 609 634 A1, wherein two stabilizer halves with actuators are also adjustable both relative to one another and relative to the vehicle body for level control. In different embodiments, a respective actuator is here connected at a corresponding end of a long stabilizer leg, thus requiring a relatively large installation space with a position that allows only minor variations.

It is an object of the invention to improve on a generic axle control element so as to provide variable installation possibilities with good functionality and relatively low space requirements.

SUMMARY OF THE INVENTION

According an aspect of the invention, an axle control element of a motor vehicle includes a torsion spring system constructed as an accumulator spring which is, on one hand, connected via a rotating arm to a wheel control element and, on the other hand, fixedly supported on the vehicle body via a controllable actuator. The torsion spring system includes at least one torsional tube and at least one torsion spring rod in a nested arrangement, thereby substantially reducing the required longitudinal installation space for the torsion spring system. The actuator includes an actuator unit spaced from the spring system and fixedly mounted on the vehicle body and a drive lever which is connected to the actuator unit and controlled for pivoting. The drive lever is connected to a torsion spring tube, and an output lever is connected to a torsion spring rod and is also connected directly or indirectly via a coupling to the wheel control element. Alternatively, the drive lever is connected to a torsion spring rod, and the output lever is connected to a torsion spring tube and is also connected directly or indirectly via a coupling to the wheel control element.

It would then be conceivable in principle to arrange an actuator unit as an actuator-gear unit concentrically around a torsion spring system nested inside each other. However, this would occupy a significant amount of radial installation space, which is frequently not available, so that arrangement and placement inside an axle system would not be possible due to lack of space.

According to the invention, the actuator is composed of an actuator unit spaced apart from the torsion spring system and fixed relative to the vehicle body and a connected drive lever which can be controllably pivoted. The torsion spring system and the required actuator are thus spatially separated, allowing a flexible arrangement in accordance with the space conditions, in particular by varying the length of the drive lever and the angular orientation between the torsion spring system and actuator unit.

Depending on the circumstances, the drive lever may also be connected to a torsion spring tube, and an output lever may also be connected to a torsion spring rod as well as directly or indirectly via a coupling to the wheel control element. An alternative arrangement is also possible depending on the functionality and installation situation, wherein the drive lever is connected to a torsion spring rod, and the output lever is connected to a torsion spring tube as well as directly or indirectly via a coupling to the wheel control element.

Advantageously, unobstructed spaces not limited by design are thus available for the inventive arrangement of the axle control elements in the mostly densely packed suspension region of a motor vehicle.

Specifically, the nested torsion spring system has a torsion spring rod made of solid material, which extends approximately horizontally in the transverse direction of the vehicle and which is partially received for rotation in a torsion spring tube, wherein the torsion spring rod is connected at one end with the associated torsion spring tube end with a rotation lock.

In addition, the torsion spring rod protrudes from the torsion spring tube opposite the connecting point, forming a torsion spring rod protrusion. The drive lever is connected to this torsion spring tube end and the output lever is connected to the torsion spring rod protrusion. Alternatively, depending on the circumstances and with basically the same functionality, the drive lever may be connected to the torsion spring rod protrusion whereas the output lever is then connected to the respective torsion spring tube end.

The functionality of the torsion spring system requires that the torsion spring tube is rotatably held in a bearing device that is fixedly connected to an subframe, and also that the actuator unit is held on the subframe.

Advantageously, the drive lever and the output lever, and optionally a coupling, are disposed in a pivot plane aligned approximately perpendicular to the axis of the torsion spring system. Depending on the installation conditions, a deviation from a vertical arrangement is possible, which would also result in unobstructed installation spaces.

Advantageously, a linear drive may be employed as an actuator unit, wherein the demands on the actuator unit for the axle control element are particularly well satisfied by an electric-motor driven ball screw drive with a position sensor and a holding brake. For a suitable arrangement with good force transmission, the effective lever of the drive lever and the axis of the linear drive should preferably form an angle of approximately 90° in the initial position.

A plug connection with toothing represents a structurally suitable solution for the particular end-side, rotation-transmitting connection between the torsion spring rod and the torsion spring tube.

When the axle control element is used as a rear axle control element, the drive lever connected to the actuator may advantageously be connected on the torsion spring rod protrusion and correspondingly an output lever connected to the adjacent torsion spring tube end may be connected via a coupling on the wheel control element.

Advantageously, however, when the axle control element is used as a front axle control element, an embodiment with a combined stabilizer is possible. Here, the torsion spring rod in the torsion spring tube is a leg portion of an L-shaped stabilizer which is bent in the region of the torsion spring rod protrusion into a second stabilizer leg part as an output lever and connected as its end via a coupling to the wheel control element. The drive lever connected to the actuator unit is here connected on the associated torsion spring tube end.

In the overall system of the chassis spring assembly, the axle control element should be an actively controlled component supporting a part, wherein the vehicle body is supported on the associated wheel by way of both a support spring and the accumulator spring of the axle control element arranged in parallel. Depending on the circumstances, wheel control elements such as control arms, in particular trapezoidal control arms, triangular control arms or single control arms may cooperate with the axle control element.

BRIEF DESCRIPTION OF THE DRAWING

The invention will now be further described with reference to the drawing, in which.

DETAILED DESCRIPTION OF PREFERRED EMBODIMENTS

Figure 1:
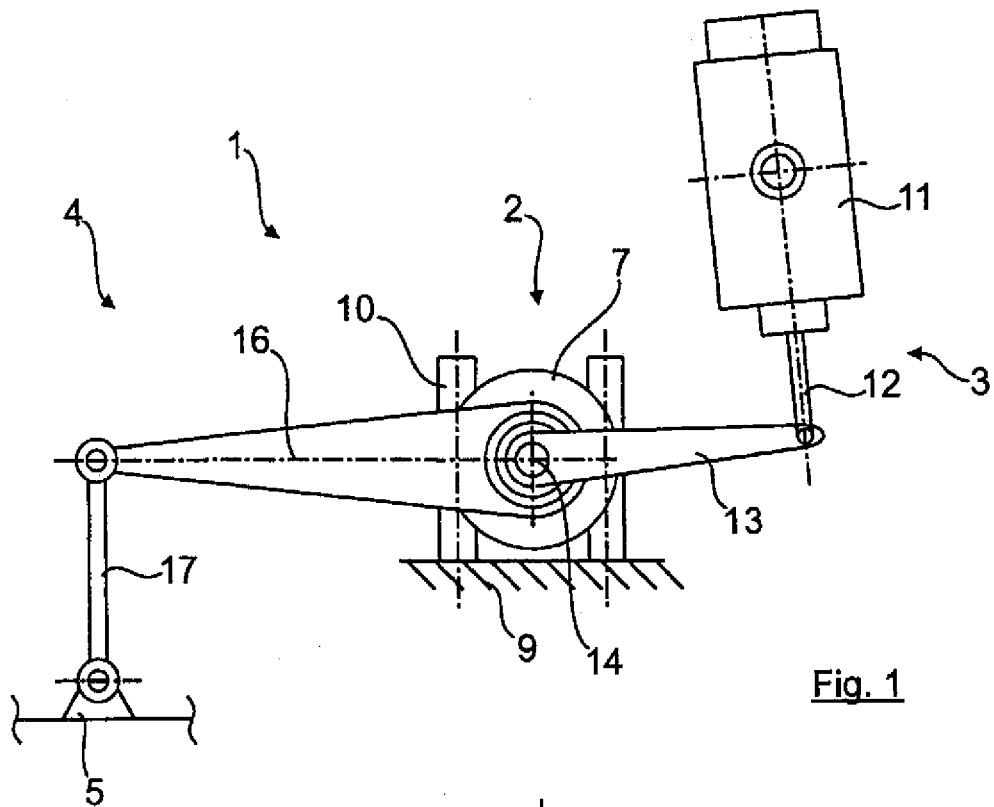
FIG. 1 shows a side view of an axle control element as a rear axle control element.
Figure 2:
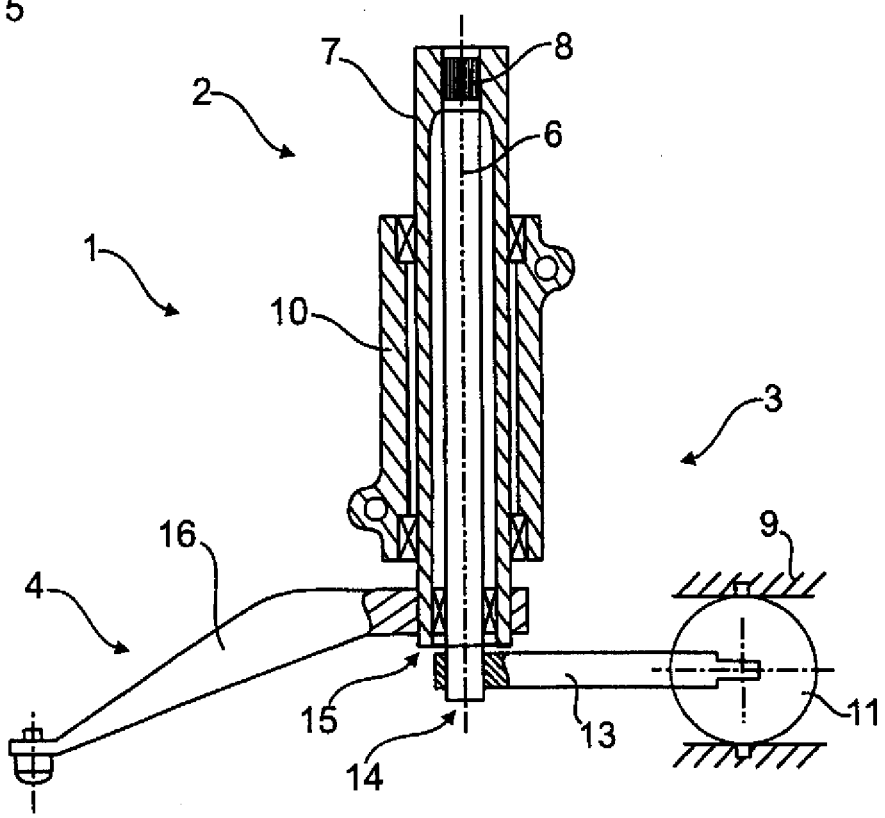
FIG. 2 a plan view of the rear axle control element of FIG. 1.

FIGS. 1 and 2 show in a side view and a plan view a rear axle control element 1 with a torsion spring system 2, an actuator 3, and an output device 4 to a wheel control element 5.

The torsion spring system 2 is composed of an inner torsion spring rod 6, which is received in a torsion spring tube 7. The torsion spring rod 6 and the torsion spring tube 7 are attached to each other at a corresponding associated end side by a rotation-transmitting toothed plug connection. The torsion spring system 2 is rotatably held with its torsion spring tube 7 in a bearing device 10 connected to an subframe 9. Likewise, an actuator unit 11 of the actuator 3 is mounted on the subframe 9.

The actuator unit 11 is configured as a linear drive in the manner of an electric-motor driven ball screw drive, wherein a drive lever 13 is articulated on the linear actuator 12. In the initial position shown in FIG. 1, the linear actuator 12 and the drive lever 13 enclose an angle of approximately 90°.

Opposite the plug connection 8, the torsion spring rod 6 protrudes from the torsion spring tube 7 with a torsion spring rod protrusion 14, wherein the drive lever 13 is connected on this torsion spring rod projection 14 with a rotation lock. An output lever 16 of the output device 4 is connected on the adjacent torsion spring tube end 15 with a rotation lock. The other end of the output lever 16 is connected to a coupling 17, which is in turn connected to the wheel control element 5, for example a trapezoidal control arm.

Accordingly, spring energy can thus be absorbed or released in the nested torsion spring system 2 of the rear axle control element 1 during alternating spring depression and rebound movement of a wheel. Moreover, torques can be superimposed with the actuator unit 11 and the drive lever 13 in order to tighten or relax the torsion spring system 2, as necessary. Due to the presence of an (unillustrated) main spring, the rear axle control element needs to provide only proportionate restoring forces for changing the wheel load, with the spring forces from the main spring and the torsion spring system 2 being continuously superimposed, depending on whether demanded by the driving situation and the applied steering.

Figure 3:
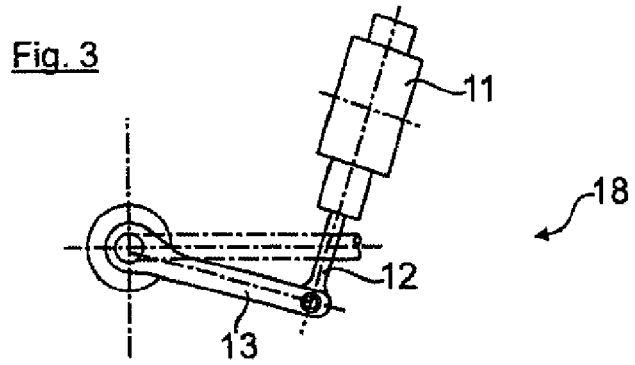
FIG. 3 shows a (partial) side view of an axle control element as a front axle control element.
Figure 4:
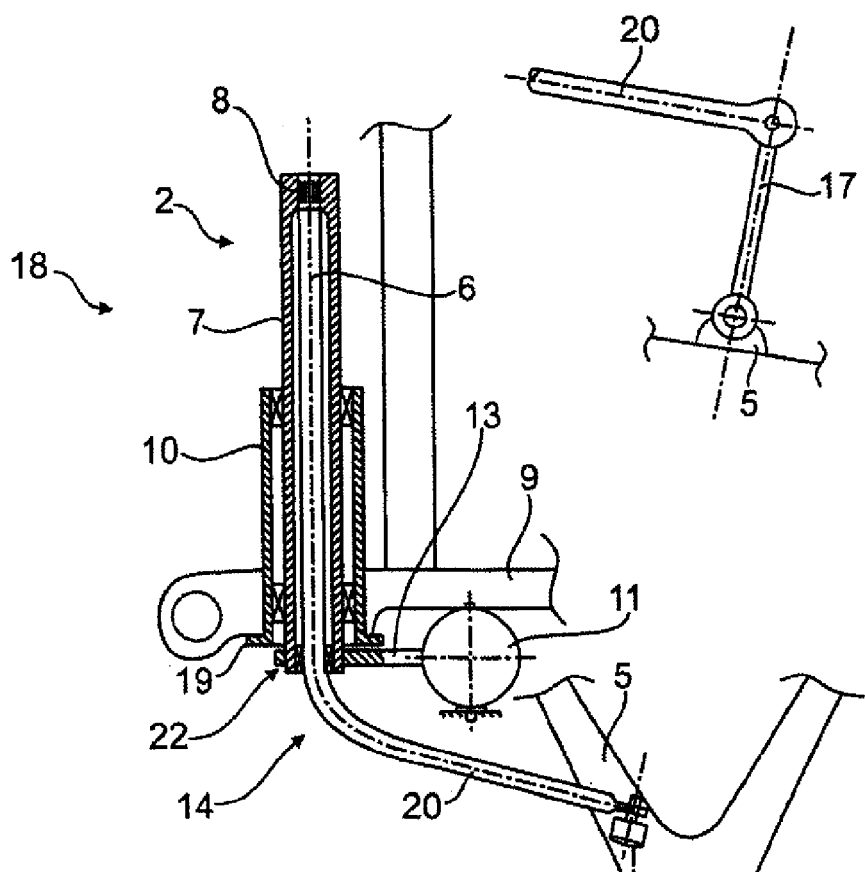
FIG. 4 shows a plan view on the front axle control element of FIG. 3.
Figure 4:
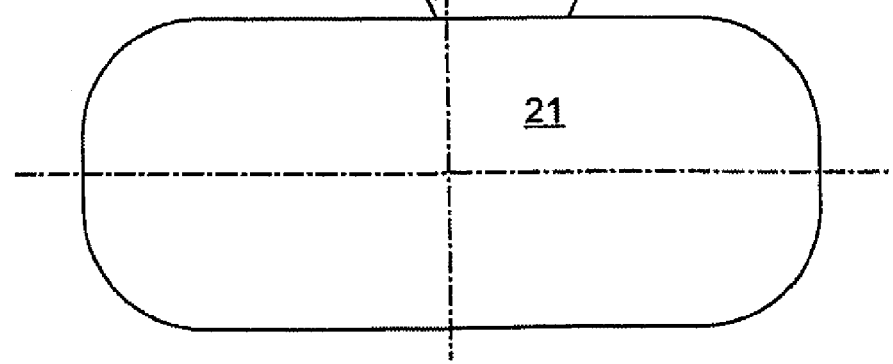

FIGS. 3 and 4 show in a side view and in a plan view, respectively, a front axle control element 18 which performs approximately the same function as the rear axle control element shown in FIGS. 1 and 2, so that the same reference numerals are used for functionally identical parts.

The front axle control element system 18 also includes a torsion spring system 2, wherein a torsion spring rod 6 is received in a torsion spring tube 7, which are connected a respective ends to a plug connection 8 with a rotation lock. The torsion spring tube 7 of the torsion spring system 2 is here also rotatably held in a bearing assembly 10 designed as a bearing bush, wherein the bearing assembly 10 is connected via a flange 19 to the subframe 9.

Furthermore, with the front axle control element 18, a actuator unit 11 in form of a ball screw drive is mounted on the subframe 9 and connected to the linear actuator 12 via a drive lever 13.

However, unlike with the rear axle control element 1, the torsion spring rod 6 in the torsion spring tube 7 is here a leg portion of an L-shaped stabilizer which is bent in the region of the torsion spring rod protrusion 14 to form an output lever in accordance with its second stabilizer leg part 20. The end of this leg portion 20 is again connected via a coupling 17 to a wheel control element 5, which is articulated on a wheel 21. By using the stabilizer leg part 20 as an output lever, the drive lever 13 in the front axle control element 18 is, unlike in the rear axle control element 1, connected to the torsion spring tube end 22 located opposite the plug connection 8 with a rotation lock.

The function of the front axle control element 18 therefore corresponds in principle to the function the described in conjunction with the rear axle control element 1.

The invention claimed is:

1. An axle control element of a motor vehicle, comprising:
a controllable actuator,
a torsion spring system comprising at least one torsion spring tube and at least one torsion spring rod nested inside the at least one torsion spring tube, said torsion spring system constructed as an accumulator spring and being connected, on one hand, via a rotating arm to a wheel control element and being fixedly supported, on the other hand, on a vehicle body via the controllable actuator,
wherein the actuator comprises an actuator unit, which is spaced from the torsion spring system and fixedly mounted on the vehicle body, and a drive lever, which is connected to the actuator unit for controlled pivoting, and wherein the axle control element is constructed such that a drive lever is connected to the at least one torsion spring tube, and an output lever is connected to the at least one torsion spring rod and is also connected directly or indirectly via a coupling to the wheel control element.

2. wherein the at least one torsion spring rod is made of a solid material and extends approximately horizontally in a transverse direction of the motor vehicle, wherein the at least one torsion spring rod is partially received in the at least one torsion spring tube for rotation, with an end of the at least one torsion spring rod being connected to an end of the at least one torsion spring tube with a rotation lock, and wherein the at least one torsion spring rod protrudes opposite from the rotation-locked connection from the at least one torsion spring tube so as to form a torsion spring rod protrusion, wherein the axle control element is constructed such that the drive lever is connected to the at least one torsion spring tube end disposed at the torsion spring rod protrusion and the output lever is connected to the torsion spring rod protrusion.

3. The axle control element of claim 2, wherein the connection is a plug connection.

4. The axle control element of claim 2, wherein the connection between the at least one torsion spring rod and the at least one torsion spring tube is constructed as a plug connection with toothing.

5. The axle control element of claim 2, wherein the axle control element is a front axle control element, wherein the torsion spring rod is a first leg portion of an L-shaped stabilizer which is bent as the output lever in a region of the torsion spring rod protrusion facing a second stabilizer leg portion and which has an end connected via the coupling to the wheel control element, and wherein the drive lever is connected to the actuator unit at a corresponding end of the at least one torsion spring tube.

6. The axle control element of claim 1, further comprising a bearing assembly affixed on a subframe and holding the at least one torsion spring tube for rotation, with the subframe also holding the actuator unit.

7. The axle control element of claim 1, wherein the drive lever and the output lever and a coupling are pivotally arranged in a pivot plane oriented approximately perpendicular to an axis of the torsion spring system.

8. The axle control element of claim 1, wherein the actuator unit comprises a linear drive, wherein an effective lever of the drive lever and an axis of the torsion spring system or the linear actuator enclose at a starting position an angle of approximately 90°.

9. The axle control element of claim 1, wherein the wheel control element comprises a control arm selected from a trapezoidal control arm, a wishbone control arm and a single control arm.

* * * * *